United States Patent
Palframan et al.

(10) Patent No.: US 9,626,297 B2
(45) Date of Patent: Apr. 18, 2017

(54) MEMORY FAULT PATCHING USING PRE-EXISTING MEMORY STRUCTURES

(71) Applicant: Wisconsin Alumni Research Foundation, Madison, WI (US)

(72) Inventors: David John Palframan, Madison, WI (US); Nam Sung Kim, Middleton, WI (US); Mikko Lipasti, Lake Mills, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 220 days.

(21) Appl. No.: 14/509,327

(22) Filed: Oct. 8, 2014

(65) Prior Publication Data
US 2016/0103729 A1    Apr. 14, 2016

(51) Int. Cl.
G06F 11/00 (2006.01)
G06F 12/0897 (2016.01)
G06F 11/16 (2006.01)
G06F 11/20 (2006.01)

(52) U.S. Cl.
CPC ...... *G06F 12/0897* (2013.01); *G06F 11/1666* (2013.01); *G06F 11/20* (2013.01); *G06F 2212/1032* (2013.01)

(58) Field of Classification Search
CPC .............................. G06F 11/073; G06F 11/793
USPC ....................................................... 714/6.1
See application file for complete search history.

(56) References Cited

U.S. PATENT DOCUMENTS

| 8,103,830 | B2 | 1/2012 | Wilkerson et al. | |
| 8,407,515 | B2* | 3/2013 | Heyrman | G06F 11/2082 714/6.12 |
| 8,621,290 | B2* | 12/2013 | Daga | G06F 11/1012 714/701 |
| 8,694,862 | B2 | 4/2014 | Sazeides et al. | |
| 8,732,523 | B2 | 5/2014 | Ozer et al. | |
| 9,176,895 | B2* | 11/2015 | Vera | G06F 12/126 |
| 2008/0010566 | A1* | 1/2008 | Chang | G06F 11/1024 714/718 |
| 2013/0094318 | A1* | 4/2013 | Kim | G06F 11/1064 365/227 |
| 2014/0006849 | A1* | 1/2014 | Ramirez | G06F 11/2053 714/6.13 |
| 2014/0108733 | A1 | 4/2014 | Wilkerson et al. | |

OTHER PUBLICATIONS

Jaume Abella et al.: RVC: A Mechanism for Time-Analyzable Real-Time Processors with Faulty Caches; Proceeding; HiPEAC'11: 6th Int. Conference on High Performance and Embedded Architectures and Compile; Jan. 24, 2011: pp. 1-10; Crete (Greece).

* cited by examiner

*Primary Examiner* — Elmira Mehrmanesh
(74) *Attorney, Agent, or Firm* — Boyle Fredrickson, S.C.

(57) ABSTRACT

A computer architecture addresses intermittent memory faults by exploiting redundancy inherent in a hierarchical memory structure, for example, as data moves through various cache levels and registers before use by the processor. Accesses to data from faulted memory areas is diverted to a secondary memory structure holding that data and the secondary memory structure is flagged to increase the persistence of the stored data used for patching against normal updating policies.

17 Claims, 3 Drawing Sheets

MEMORY FAULT PATCHING USING PRE-EXISTING MEMORY STRUCTURES

STATEMENT REGARDING FEDERALLY SPONSORED RESEARCH OR DEVELOPMENT

This invention was made with government support under 1016262, 1318298, and 1116450 awarded by the National Science Foundation and HR0011-12-2-0019 awarded by the DOD/DARPA. The government has certain rights in the invention.

CROSS REFERENCE TO RELATED APPLICATION

--

BACKGROUND OF THE INVENTION

The present invention relates generally to computer architectures and, in particular, to a computer architecture that allows "patching" of failed memory elements using alternative pre-existing memory.

The ability to fabricate processors using smaller transistors has allowed the construction of processors with greater transistor density and as a result many more transistors. Although the smaller transistors can have improved energy efficiency, generally the energy efficiency of each generation of smaller transistors lags behind the growth in transistor density. This leads to two distinct power dissipation problems: (1) the problem of "power density", often leading to "local thermal hot-spots", where a particular region of the chip consumes more power than can be quickly dissipated causing a rapid rise in temperature in that region, and (2) the problem of "global power dissipation" where the power consumed by the entire chip cannot be fully dissipated using cost-effective cooling methods.

These problems of power dissipation are generally addressed in two different ways. When performance is not critical, the operating voltage and clock speed of the processor may be reduced. Power consumption scales quadratically with supply voltage and so this approach allows for substantial power savings. Lower operating voltages can cause voltage-dependent errors in memory structures such as the processor cache.

An alternative approach is to push the temperature limits of the processors with the expectations of some levels of error. Higher operating temperatures can also cause temperature-dependent errors in memory structures such as the processor cache.

A variety of methods exist to mitigate temperature-dependent or voltage-dependent memory errors. For example, memory circuits can be redesigned to incorporate more components (for example, using eight transistor SRAM cells rather than six transistor SRAM cells) which provides decreased voltage and noise sensitivity. Alternatively or in addition, redundancy may be incorporated into the memory circuits, for example, using additional error correcting codes. Some errors can be mitigated by making the transistors of the memory circuits larger to reduce process variation that limits temperature or voltage reduction as dependent on "weakest link" memory cells.

Each of these techniques generally increase the size and hence the cost of the processor or memory structure.

SUMMARY OF THE INVENTION

The present invention mitigates intermittent memory errors using pre-existing memory structures intended for other purposes. For example, the miss-status handling registers can be used to patch the instruction cache. Redundant data in other pre-existing structures is flagged, for example, with "persistence bits" that reduce the overwriting of this data so it can serve to patch memory faults. In this regard, the present inventors have determined that under normal operating conditions there is excess capacity in many redundant memory structures, thus providing a solution with little or no cost impact.

Specifically then, the invention provides an electronic computer having a processing unit for executing instructions operating on data and an electronic memory system adapted to hold instruction values and data values and communicate to them with the processing unit. The electronic memory system provides a hierarchy of memory storage structures providing redundant storage of the instruction values and data values among the memory storage structures. Memory updating circuitry implements replacement and write-handling policies to maintain and update one or more copies of the contents of a given memory address in these different storage structures.

The electronic computer further includes data access circuitry tracking intermittent faults in first memory locations in a first memory storage structure and, at times when there is an intermittent fault in the first memory location, (a) directing memory accesses intended for the first memory locations to corresponding second memory locations of a second data structure providing redundant storage of data with the first memory locations to patch the first memory locations; and (b) increasing a persistence of data in second memory locations against updating by the memory updating circuity in comparison to the persistence of the data in the second memory locations when there is no intermittent fault in the first memory locations.

It is thus a feature of at least one embodiment of the invention to make use of the natural redundancy in data storage found in hierarchical memories to patch intermittent memory faults.

The first and second data structures may each provide additional functions unrelated to patching the first memory locations.

It is thus a feature of at least one embodiment of the invention to make use of pre-existing memory structures for patching intermittent memory faults to reduce the added cost to the processor system.

The first memory structure may be an instruction value cache and the second memory structure either or both of a micro-op cache and a miss-status handling register for instruction values. Alternatively or in addition, the first memory structure may be a data value cache and the second memory structure may be either or both of a store queue and a miss-status handling register for data values.

It is thus a feature of at least one embodiment of the invention to make use of common memory structures, necessary in super-scalar processors, for memory patching.

Alternatively or in addition, the first memory location may be a first cache memory and the second memory location may be a second cache memory at a different cache level than the first cache memory.

It is thus a feature of at least one embodiment of the invention to make use of hierarchical cache structures for the purpose of patching intermittent faults.

The data access circuitry may include a fault record identifying intermittent faults in the first memory storage structure, and the data of the fault record may change as a function of at least one input value selected from the group consisting of one or more of a value indicating an operating voltage of the first data structure, a value indicating an operating temperature of the first memory structure, and a value indicating a result of an episodic memory check of the first memory structure.

It is thus a feature of at least one embodiment of the invention to provide a system that may accommodate dynamically changing faults efficiently without the need to "over provision" the electronic computer with backup memory that is sized to accommodate a maximum number of faults and then largely unused at other time The data access circuitry may conduct memory accesses intended for the first memory locations to corresponding second memory locations of a second data structure as a function of whether there is an intermittent fault in the first memory location.

It is thus a feature of at least one embodiment of the invention to permit the present invention to work both with hierarchical memory structures that naturally occlude a faulting memory structure (for example, a micro-op cache and the instruction register) and those that do not naturally occlude a faulting memory structure (for example, a miss-status handling register and instruction register).

The fault record may be a lookup table of predetermined values relating faults to different operating voltage of the first data structure.

It is thus a feature of at least one embodiment of the invention to provide a dynamic fault record that can accommodate changing fault patterns as operating voltage changes while limiting costly alternative techniques to resist faults.

The data access circuitry may further include a policy circuit overriding the increase in persistence of the data according to an assessment of operation of the second memory structure for its originally intended purpose unrelated to patching the first memory structure.

It is thus a feature of at least one embodiment of the invention to efficiently balance the trade-off between using a particular memory structure for its intended purpose and for the purpose of patching memory faults.

The overriding of an increase in persistence of the data may be a function of one or more of usefulness of data in the second memory locations for patching indicated by frequency of access, percentage of the second data structure having increased persistence for patching, a measure of access misses in the second data structure and a determination of whether the processor is will stall if allocation of new entries is delayed. It is thus a feature of at least one embodiment of the invention to make use of pre-existing memory structures while ensuring the structures are still functional for their original purpose.

The second memory structure may provide an architecture more resistant to errors than the first memory structure.

It is thus a feature of at least one embodiment of the invention to selectively "harden" some memory structures used for fault handling with the expectation that the hardening overhead will be less than required of the memory structure having the faults and because of the size difference between the structures.

The data access circuitry may set persistence bits in the secondary memory structure that are read by the memory updating circuitry to avoid updating a portion of the second memory with set-persistence bits.

It is thus a feature of at least one embodiment of the invention to provide a simple method of increasing the persistence of memory used for patching faults.

These particular objects and advantages may apply to only some embodiments falling within the claims and thus do not define the scope of the invention.

DETAILED DESCRIPTION OF THE PREFERRED EMBODIMENT

Figure 1:
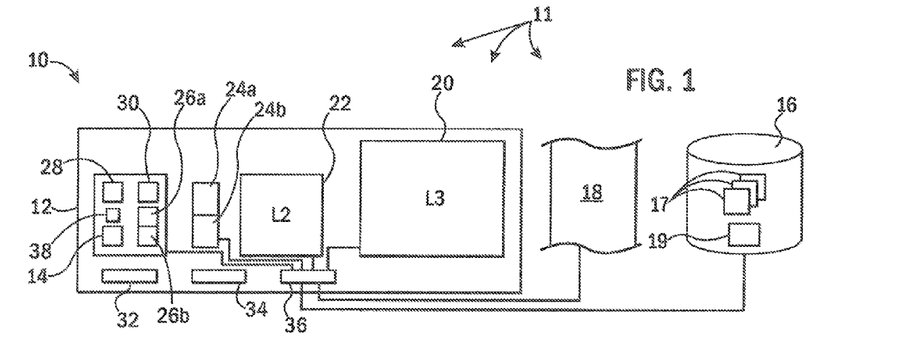
FIG. 1 is a simplified block diagram of an electronic processor architecture showing a hierarchy of memory devices including a micro-op cache, MSHRs, a store queue, L1, L2, and L3 caches, DRAM main memory and a disk drive.

Referring now to FIG. 1, a computer system 10, for example, implemented as one or more interconnected integrated circuits, may provide at least one superscalar processor 12, including an arithmetic logic processor 14 providing generally for the implementation of mathematical and logical operations using instruction values and data values. The processor 14 may obtain instruction values and data values from a hierarchical memory structure 11 including disk drive 16, main memory 18. L3 cache 20, L2 cache 22, L1 cache 24, miss-status handling registers (MSHRs) 26, micro-op cache 28, and store queue 30. The L1 cache 24 may be divided into an instruction cache 24a and a data cache 24b. Generally the caches 20, 22, 24 and the MSHRs 26, micro-op cache 28, and store queue 30 are constructed of static random access memory (SRAM). In one embodiment each of the caches 20, 22 and 24 will use standard six-transistor SRAM cells. The MSHRs 26, micro-op cache 28, and store queue 30 may be fabricated from SRAM cells and may optionally be fortified using eight-transistor SRAM cells and/or increasing the area of the transistors or other known technique to better fortify them against voltage or temperature induced memory faults.

As is understood in the art, instructions and data flow generally between the disk drive 16 and the processor 14 passing from the disk drive 16 to the main memory 18 and then through L3 cache 20, L2 cache 22 and then via MSHRs 26 to the L1 cache 24. Instruction values may flow from the L1 cache through the micro-op cache 28 to the processor 14 while data values may flow from the L1 cache to the processor 14.

The results of processing by the processor 14 produces data values that then flow along the reverse path described, from the processor 14 back to the disk drive 16, The disk drive 16 may hold programs 17 and memory 19, the programs typically including an operating system program of the type known in the art.

The purpose of this memory hierarchy is to effect a trade-off between the costs of memory storage and data access speed. Generally the disk drive 16 provides a low cost of storage but slow access whereas structures such as the L1 cache 24 provide fast access but are relatively expensive in terms of using valuable integrated circuit space near the processor 14. Generally the disk drive 16 at the beginning of the hierarchy has the highest storage capacity while the micro-op cache 28 and the store queue 30 have the least storage capacity. Data is generally moved to the hierarchy in blocks based on anticipated need, such movement normally including data that will ultimately not be used. Control of the flow of data through this hierarchy may be according to memory updating circuitry 36 implemented typically with the combination of dedicated hardware and software including, for example, portions of the operating system program 17.

The computer system 10 may also include I/O circuits 32 for communicating between the computer system 10 and other devices such as networks, user interfaces (such as monitors, keyboards, etc.) and the like. The computer system 10 may also include a power management circuit 34 generally providing control of the clock speed of the various components of computer system 10, and the operating voltage of the various components of the computer system 10. The power management circuit 34 implements a power management control strategy that controls clock speed and voltage to reduce power consumption and/or heat dissipation according to techniques well-known in the art.

In this regard, the power management circuit 34 may monitor temperature and the use of the various components of computer system 10 during execution and may independently control the voltage and operating state of one or more of the components including the processor 14 and the various caches 20-24 in one or more control domains.

Figure 2:
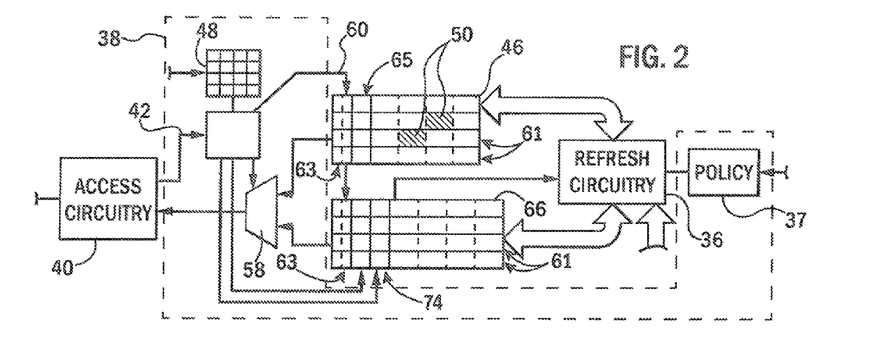
FIG. 2 is a functional diagram of the present invention as applied to a first and second memory storage structure and providing a patch controller and a policy engine.
Figure 3:
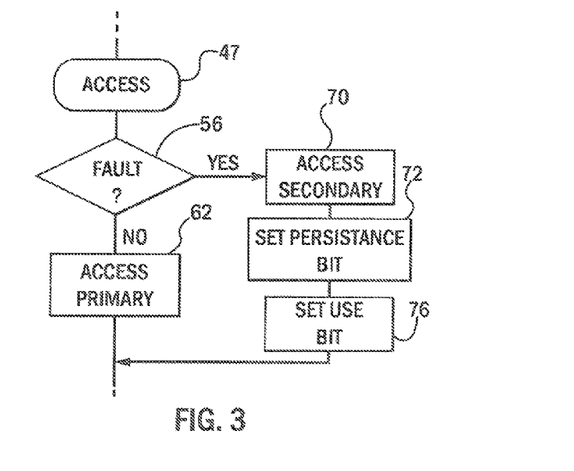
FIG. 3 is a simplified flowchart of the operation of the patch controller of FIG. 2 in patching faulting memory sub-blocks in a first data structure including the setting and release of persistence and use bits.

Referring now also to FIGS. 2 and 3, computer system 10 may further include a fault handling circuitry 38 of the present invention integrated closely with other elements of the computer system 10. The fault handling circuitry 38 will generally intercept memory access requests 42 for data or instructions from access circuitry 40 associated with the processor 14 and will patch them with data from other pre-existing memory structures and will promote use of the other memory structures that beneficially increases the opportunities for patching.

Generally, a memory access request 42 received by a patch circuitry 44 will designate a request for data values or instruction values from a given logical memory address. This access request is indicated by process block 47 of FIG. 3 and will be nominally directed to a first memory storage structure 46 in the hierarchical memory structure 11.

Upon receiving the memory access request 42, the patch circuitry 44 consults a fault table 48 that indicates currently faulting sub-blocks 50 (shown as shaded) of a given line 51 (depicted as a row) of the first memory storage structure 46. The term "sub-block" as used herein is not intended to designate a particular type of memory structure, but simply an independent element of any structure in which a fault may be detected and recorded.

A faulting sub-block 50 is one which currently will not reliably store values (instruction values or data values), for example, because of operating voltage reductions under the policy of the power management circuit 34. Typically a faulting sub-block is experiencing an intermittent fault.

Figure 5:
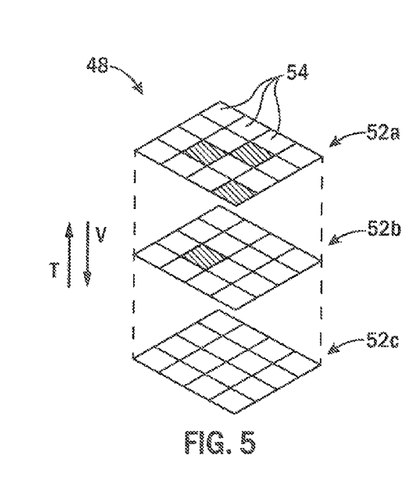
FIG. 5 is a logical representation of a fault table for intermittent faults responsive to a changing dimension of operating voltage and/or operating temperature.

Referring momentarily to FIG. 5, in one embodiment the fault table 48 may provide for a set of different logical tables 52*a-c* associated with different operating conditions where data in the tables 52 allow the tracking of intermittent faults. For example, each of the tables 52 may indicate faults at a different operating voltages or different operating temperatures. Population of the tables 52 with data may be done, for example, at the time of manufacture or by the operating system on a dynamic basis by executing a memory check procedure on the first memory storage structure 46 at different temperatures or voltages. Such a memory check procedure, for example, may read and write known values to the first memory storage structure 46 to test for faults. Alternatively error correction procedures may be used to determine faults on a dynamic basis and detect errors used to populate tables 52.

Generally each of the tables 52 may provide for a plurality of table entries 54 corresponding to sub-blocks 50 in the first memory storage structure 46 which may be flagged (for example, with a one or zero value) indicating whether the corresponding sub-block has faulted or is expected to be faulted. In use, one of the tables 52 is selected according to a current operating condition, and then the table entries 54 for a sub-block 50 subject to data access is interrogated.

Returning again to FIGS. 1, 2 and 3, the circuitry 44 upon receipt of the memory access request 42 consults the fault table 48 according to input values of temperature, voltage, or the like and according to the address of the access request to determine whether the request relates to a faulting sub-block 50 as indicated by decision block 56. If there is no fault in the accessed sub-block 50, the circuitry 44 applies the address of the memory access request 42 to address entries 63 of the first memory storage structure 46 and controls a multiplexer 58 to receive data from the first memory storage structure 46 at the desired sub-block 50. This process is indicated generally at process block 62.

If at decision block 56, the fault table 48 indicates that there is a fault in the sub-block 50 to be accessed, then the patch circuitry 44 provides the necessary address information to address entries 63 of a second memory storage structure 66 providing redundant data to the first memory storage structure 46. The data requested is then returned through the multiplexer 58, controlled by the patch circuitry 44, from the second memory storage structure 66 as indicated by process block 70.

It will be understood that the process of accessing the secondary memory storage structure 66 may be recursive. That is, if the data is not in the secondary memory storage structure 66, the invention will invoke an update policy in which a third or fourth memory storage structure in the hierarchy is accessed in order to obtain the necessary data. Each of those latter memory storage structures may implement the steps of FIGS. 3 and 4 in turn. In other words, it is contemplated that the second memory storage structure 66 may also have faulted sub-blocks 50, in which case the same process described here with respect to the first memory storage structure 46 and second memory storage structure 66 may be performed, for example, between the second memory storage structure 66 and a third memory storage structure lower in the hierarchy.

After the access of process block 70, at process block 72, the patch circuitry 44 sets a persistence bit 65 in the second memory storage structure 66 indicating that the line 61 that was accessed at process block 70 is being used as a patch for faulting memory sub-blocks 50 in the first memory storage structure 46. In this case, the persistence bit applies to a full line 61 of the second memory storage structure 66 rather than a given sub-block 50; however, it will be appreciated that an arbitrary level of granularity may be provided as desired.

In one embodiment, as indicated by process block 76, the patch circuitry 44 next may set a use bit indicating that the particular line 61 has been used (that is, accessed) which will be used to guide a replacement policy as will be discussed below.

Figure 4:
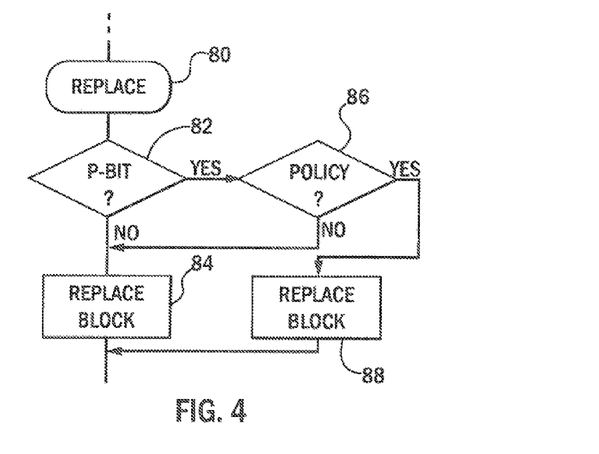
FIG. 4 is a simplified flowchart of the operation of the policy engine of FIG. 2 in updating the first and second data structures according to the persistence and use bits.

Referring now to FIGS. 2 and 4, typically in parallel with the above process, first memory storage structure 46 and second memory storage structure 66 will be updated according to the update circuitry 36. In this update process, new data may be loaded into second memory storage structure 66 (from another structure in the hierarchy) and data from second memory storage structure 66 may be loaded into the first memory storage structure 46. The update process, may be in response to a cache miss or the, like or in anticipation of future accesses based on current accesses and is indicated generally by process block 80.

At the time of replacement of data in the second memory storage structure 66, the update circuitry 36 will determine whether there are persistence bits 65 associated with memory lines 61 in the second memory storage structure 66 receiving data and will attempt to manage the replacement process in a way that preserves the data associated with the persistence bits 65 so that it may continue to provide a patching of corresponding lines 61 in the first memory storage structure 46.

Specifically, as indicated by decision block 82, the update circuitry 36 reviews destination addresses in the receiving second memory storage structure 66 to identify persistence bits 65 and if there are none set, replaces the data in those addresses as indicated by process block 84. If the lines 61 to be replaced have persistence bits 65, then at decision block 82, the refresh circuitry 36 proceeds to decision block 86 to evaluate a policy threshold as to whether the persistence bits 65 will be honored with respect to preserving the data in those lines 61.

Generally holding data persistently in the second memory storage structure 66 carries with it costs of reducing the availability of the second memory storage structure 66 for its intended purpose which, is typically that of speeding processing of data as it moves between the processor and memory. The policy of decision block 86 may be implemented by a policy engine 37 and generally looks to provide an effective trade-off between these uses of second memory storage structure 66. The policy engine 37 may make decisions based on dynamically received data For example, policy engine 37 may implement a policy that receives and considers the percentage of the second memory storage structure 66 subject to persistence bits 65 and, for example, provides a target percentage that may not be exceeded. For example, the policy may prevent overwriting lines 61 subject to persistence bits 65 if the total number of lines subject to persistence bits 65 is less than ten percent of the total storage area of the second memory storage structure 66. This particular threshold may be set empirically or may be tuned dynamically, for example, by the operating system by monitoring proxies for inefficiencies such as cache misses, process execution time or the like.

Other possible policies may consider the usefulness of the data subject to the persistence bit 65, measuring, for example, by the use bits 74 described above, how much use that particular data block has had in providing for redundancy for faulted sub-blocks 50. This particular policy will tend to provide higher priority in persistence to line 61 associated with multiple faulting sub-blocks 50 but will also provide high priority persistence to lines 61 with as few as a single opening sub-block when that faulting sub-block's data is required frequently.

The policy engine 37 may apply usefulness against a predetermined threshold, evicting only lines 61 having low use or the policy engine 37, when other policy concerns dictate that lines 61 with set persistence bits 65 must be replaced, replaces those lines 61 having lower usefulness first.

If the decision at decision block 86 is to ignore the persistence bit 65, then the program proceeds to process block 84 and the particular line 61 of the faulted sub-block 50 is overwritten and its persistence bit 65 is reset. Otherwise, at process block 88, the particular line 61 is preserved without overwriting and the update circuitry 36 behaves as if no additional locations are available in the second memory storage structure 66 either preventing the receipt of new data or overwriting other data not subject to the persistence bit.

Generally the first memory storage structure 46 and the second memory storage structure 66 may be implemented by any of the following combinations in a given row of the following Table I:

TABLE 1

| FIRST DATA STRUCTURE | SECOND DATA STRUCTURE |
|---|---|
| Instruction value cache 24a | Micro-op cache 28 |
| Instruction value cache 24a | Instruction MSHRs 26a |
| Data value cache 24b | Store queue 30 |
| Data value cache 24b | Data value MSHRs 26b |
| L2 cache 22 | L1 cache 24 |
| L3 cache 20 | L2 cache 22 |
| Main memory 18 | L3 cache 20 |

Example I

Figure 6:
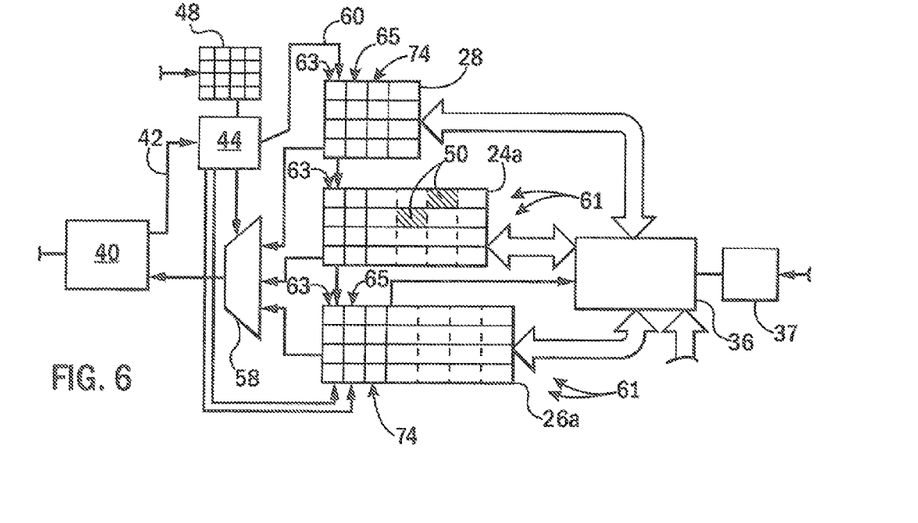
FIG. 6 is a more detailed example of the invention used to patch an instruction cache using the micro-op cache and the instruction MSHRs.

Referring now to FIG. 6, in one example embodiment, the invention may provide a patching of the instruction cache 24 making use of the micro-op cache 28 and the instruction MSHRs 26a. During normal operation, the instructions from the instruction cache 24a are decoded into micro-operations that are stored in the micro-op cache 28. On a micro-op cache 28 miss, instructions are read from the instruction cache 24a or the associated instruction MSHRs 26a. In this respect, the micro-op cache 28 will naturally patch bad sub-blocks 50 in the instruction cache 24a and may be said to occlude faults in the instruction cache 24a.

In the event that data from a bad sub-block 50 is needed and is not in the micro-op cache 28, the patch circuitry 44 forces a miss when the instruction cache 24a is accessed as guided by the fault table 48. The fetch then reads the necessary data from the instruction MSHR 26a and loads that data into the micro-op cache 28 together with a persistence bit 65 indicating that entry in the micro-op cache 28 is serving the patch in the instruction cache 24a and thus should be preserved if possible. As noted, the persistence bit 65 modifies the replacement policy affected by the refresh circuitry 36 according to the policy engine 37, so that this data marked with the persistence bit 65 is favored with respect to preservation as opposed to data not marked with a persistence bit.

The patch circuitry 44 also sets use bits 74 in the micro-op cache 28 that can be used as part of the replacement policy discussed above to prefer persistence for lines 61 of the micro-op cache 28 with persistence bits 65 and high numbers for use bits 74 cases where some lines 61 need to be ejected those the micro-op cache 28.

Alternatively or in addition, the instruction MSHRs 26a may be used to perform the patching of the instruction cache 24a. As is generally understood in the art, MSHRs 26 are used to track outstanding misses that must be serviced from a lower level cache or memory. They allow non-blocking memory requests by storing the data needed to continue the operation once the data is available. Each instruction MSHR 26a has an associated fill buffer entry to hold the data before it is written into the cache 24. Since the cache line may not be furnished by the lower-level cache all at once, each instruction MSHR 26a contains valid bits (not shown) to track which sub-blocks are currently valid in the associated fill buffer. Once all sub-blocks are valid, the line is written to the instruction cache 24a from the buffer, and the instruction MSHR 26a and buffer can be freed. For best performance, MSHRs 26a are able to service loads from partially accumulated cache blocks or blocks that have not yet been written to the instruction cache 24a. A memory access request 42 will check its address against the block address stored by the instruction MSHR. 26a to see whether the data required is currently valid in the buffer on a match, and the load can be serviced directly from the fill buffer. Otherwise the load misses. As before, a persistence bit 65 is used to indicate whether each entry in the instruction MSHRs 26a is a patch of the instruction cache 24. Use bits 74 are also provided to allow the replacement policy to preserve, preferentially, lines 61 of the instruction MSHRs 26a, associated with persistence bits 65, that are also frequently used.

When access to an unpatched, faulting sub-block 50 of the instruction cache 24a is attempted, a cache miss is invoked and the instruction MSHR 26a tasked with obtaining the necessary data. Once the entire cache line has been accumulated by the instruction MSHRs 26a in line 61, it is written into the instruction cache 24a (for the purpose of populating the fault-free sub-blocks 50) but instead of the line 61 of the instruction MSHRs 26a being freed, the line 61 of the instruction MSHRs 26a is retained and the persistence bits 65 set. The same data is now present in both the MSHR and the cache 24. The patch circuitry 44 requires that a hit in the MSHRs will take precedence over the instruction cache 24 so that as many loads as possible will be serviced from the MSHRs avoiding disabled cache sub-blocks.

Again the update circuitry 36 may follow a policy engine 37 in respecting the persistence bits 65. A line in the instruction MSHRs 26a with a set persistence bit 65 can be invalidated if all the space in the instruction MSHRs 26a is in use and the instruction cache 24a needs to allocate MSHR space to handle a new miss. Once a line 61 of the instruction MSHRs 26a is overwritten, a copy of the line 61 in the cache 24 becomes unpatched and persistence bits 65 in the corresponding line 61 of the overwritten instruction MSHR 26a are reset.

it will be appreciated that both the micro-op cache 28 and the MSHR 26 may be used for patching at the same time. This shared responsibility may be implemented by dividing the addresses of the instruction cache 24 among these different patch structures. Alternatively both mechanisms may be applied to all errors; that is lines of the MSHR 26 used for patching may be marked with a persistence bit 65 and that data, when read by the micro-op cache 28, may also be marked with a persistence bit 65.

Example II

Figure 7:
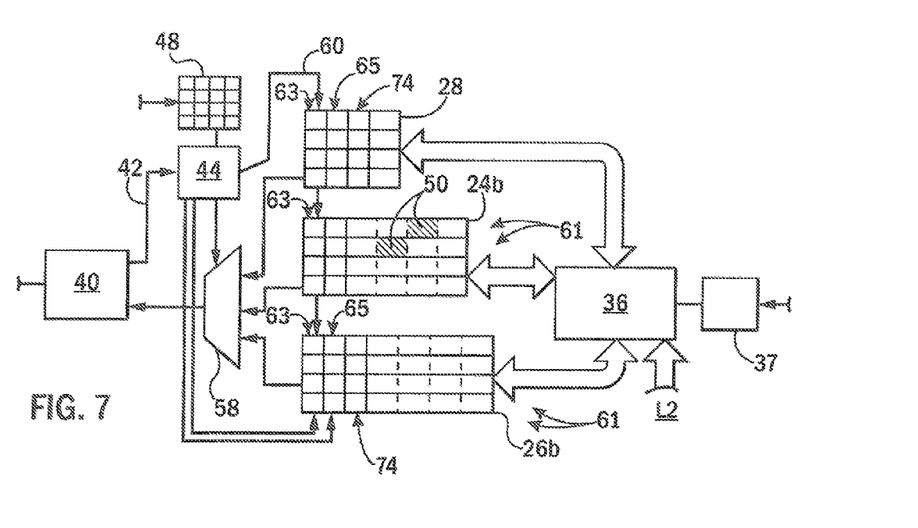
FIG. 7 is a more detailed example of the invention when used to patch a data cache using the store queue and the data MSHRs.

Referring now to FIG. 7, the same technique may be applied alternatively or in addition to the to the data cache 24b which may be patched with the store queue 30 or the data MSHRs 26b. Generally, the store queue 30 in an out-of-order processor allows memory instructions to be executed out-of-order while maintaining program-order dependencies between the data of different instructions. The store queue 30 is also responsible for managing and squashing speculative memory accesses if necessary. The store queue 30 holds pending stores that have not yet been written to the data cache 24b. Each load instruction is assigned a store "color" corresponding to the most recent store instruction in program order. Using its store color, each loading memory access request 42 checks the store queue 30 for older stores to the same address, if a match is found, data is forwarded from the matching store queue entry to the load.

The store queue 30 may thus be used to patch the data cache 24b in the same manner as described above with respect to the micro-op cache 28 patching the instruction cache 24a. Loads nominally intended to be serviced by faulting sub-blocks 50 of data cache 24b are served by the store queue 30 instead. Persistence bits 65 and use bits 74 may be added to the store queue 30 for the purpose of preserving this data and effecting an efficient replacement policy as described before.

Some architectures allow forwarding from completed stores in the store queue 30. For these entries, the store instruction has been committed and the stored data has already been written to the data cache 24b. Normally there would not be much utility in keeping these entries; however, allowing completed stores is beneficial if these entries are patches. Allowing completed entries to be retained does not degrade performance or cause deadlock since if a new store queue entry must be allocated, a completed entry can immediately be invalidated. This status as completed may be marked by a bit (not shown) and may serve as the persistence bit 65 or, alternatively, a separate bit that may be employed.

By allowing completed stores in the store queue 30, some faults of the data cache 24b will be patched as a side effect. In this implementation, all stores in the store queue 30 including those addressing disabled cache sub-blocks 50 are upgraded to completed status after writing to the cache.

Depending on store queue 30 implementation, additional improvements can be obtained. Although the store queue 30 is traditionally implemented as a circular buffer, it is known to implement such store queues 30 in unordered fashion. Accordingly the patch circuitry 44 can benefit by removing entries from the store queue 30 out-of-order to allow non-patch entries that have been completed to be removed in favor of completed patch entries that serve as patches. Alternatively, a circular store buffer may be combined with a separate unordered buffer for completed stores.

End of Example II

Intermittent faults as used herein, means faults that can and are expected to occur and disappear over the expected operating life of the processor and may be distinguished from permanent faults that result from manufacturing defects and that manifest as faults continuously for the entire life of the computer.

It will be appreciated that the various circuits and components as described herein may be dedicated circuitry or combinations of circuitry and firmware and/or circuitry and software and that particular functions described herein as distinct circuitry may share hardware and software elements and are depicted as separate isolated components as a logical matter primarily for the purpose of clarity.

Certain terminology is used herein for purposes of reference only, and thus is not intended to be limiting. For example, terms such as "upper", "lower". "above", and "below" refer to directions in the drawings to which reference is made. Terms such as "front", "back", "rear", "bottom" and "side", describe the orientation of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first", "second" and other such numerical terms referring to structures do not imply a sequence or order unless clearly indicated by the context.

When introducing elements or features of the present disclosure and the exemplary embodiments, the articles "a", "an", "the" and "said" are intended to mean that there are one or more of such elements or features. The terms "comprising", "including" and "having" are intended to be inclusive and mean that there may be additional elements or features other than those specifically noted. It is further to be understood that the method steps, processes, and operations described herein are not to be construed as necessarily requiring their performance in the particular order discussed or illustrated, unless specifically identified as an order of performance. It is also to be understood that additional or alternative steps may be employed.

References to "a processor" and "a computer" or the like can be understood to include one or more processors, computers, etc. That can communicate in a stand-alone and/or a distributed environment(s), and can thus be configured to communicate via wired or wireless communications with other processors, where such one or more processor can be configured to operate on one or more processor-controlled devices that can be similar or different devices. Furthermore, references to memory, unless otherwise specified, can include one or more processor-readable and accessible memory elements and/or components that can be internal to the processor-controlled device, external to the processor-controlled device, and can be accessed via a wired or wireless network.

It is specifically intended that the present invention not be limited to the embodiments and illustrations contained herein and the claims should be understood to include modified forms of those embodiments including portions of the embodiments and combinations of elements of different embodiments as come within the scope of the following claims. All of the publications described herein, including patents and non-patent publications, are hereby incorporated herein by reference in their entireties.

What we claim is:

1. An electronic computer comprising:
   a processing unit for executing instructions operating on data;
   an electronic memory system adapted to hold instruction values and data values and communicate them with the processing unit, the electronic memory system providing a hierarchy of memory storage structures providing redundant storage of the instruction values and data values among the memory storage structures;
   memory updating circuitry operating to update the values stored in the hierarchy of memory storage structures between different memory storage structure per the hierarchy; and
   data access circuitry tracking intermittent faults in first memory locations in a first memory storage structure and, at times when there is an intermittent fault in the first memory location, operating to:
   (a) direct memory accesses intended for the first memory locations to corresponding second memory locations of a second data structure providing redundant storage of data with the first memory locations to patch the first memory locations; and
   (b) increase a persistence of data in second memory locations against updating by the memory updating circuitry in comparison to the persistence of the data in the second memory locations when there is no intermittent fault in the first memory locations.

2. The electronic computer of claim 1 wherein the first and second data structures each provide additional functions unrelated to patching the first memory locations.

3. The electronic computer of claim 2 wherein the first memory structure is an instruction value cache and the second memory structure is selected from the group consisting of a micro-op cache and a miss-status handling register for instruction values.

4. The electronic computer of claim 3 wherein the second memory location includes memory locations from both the micro-op cache and the miss-status handling registers for instruction values.

5. The electronic computer of claim 2 wherein the first memory structure is a data value cache and the second memory structure is selected from the group consisting of a store queue and miss-status handling registers for data values.

6. The electronic computer of claim 5 wherein the second memory location includes memory locations from both the store queue and the miss-status handling registers for data values.

7. The electronic computer of claim 2 wherein the first memory location is a first cache memory and the second memory location is a second cache memory at a different cache level than the first cache memory.

8. The electronic computer of claim 2 wherein the first memory location is a DRAM random access memory and the second memory location is a SRAM cache memory.

9. The electronic computer of claim 1 wherein the data access circuitry directs memory accesses intended for the first memory locations to corresponding second memory locations of a second data structure as a function of whether there is an intermittent fault in the first memory location.

10. The electronic computer of claim 1 wherein the data access circuitry includes a fault record identifying intermittent faults in the first memory storage structure and wherein the data of the fault record changes as a function of at least one input value selected from the group consisting of a value indicating an operating voltage of the first data structure, a value indicating an operating temperature of the first memory structure, and a value indicating a result of a periodic memory check of the first memory structure.

11. The electronic computer of claim 10 wherein the fault record is a lookup table of predetermined values relating faults to different operating voltages of the first data structure.

12. The electronic computer of claim 1 wherein the data access circuitry further includes a policy circuit overriding the increase in persistence of the data according to an assessment of operation of the second memory structure for a purpose unrelated to patching the first memory structure.

13. The electronic computer of claim 1 wherein the data access circuitry further includes a policy circuit overriding the increase in persistence of the data as a function of at least one of the group consisting of; usefulness of data in the second memory locations for patching indicated by frequency of access, percentage of the second data structure having increased persistence for patching, a measure of access misses in the second data structure; and a determination of whether the processor will stall if allocation of new entries is delayed.

14. The electronic computer of claim 1 wherein the hierarchy of memory locations provides for memory structures providing a range of different tradeoffs between data access speeds and data storage costs.

15. The electronic computer of claim 1 wherein the hierarchy of memory structures includes at least three of a micro-op cache, an instruction cache, a data cache, miss-status handling registers, an L1 cache, an L2 cache, an L3 cache, and a dynamic random access memory array.

16. The electronic computer of claim 1 wherein the second memory structure provides an architecture more resistant to errors than the first memory structure.

17. The electronic computer of claim 1 wherein the data access circuitry sets persistence bits in the second memory structure that are read by the memory updating circuitry to avoid updating a portion of the second memory with set persistence bits.

* * * * *